Figure 1:
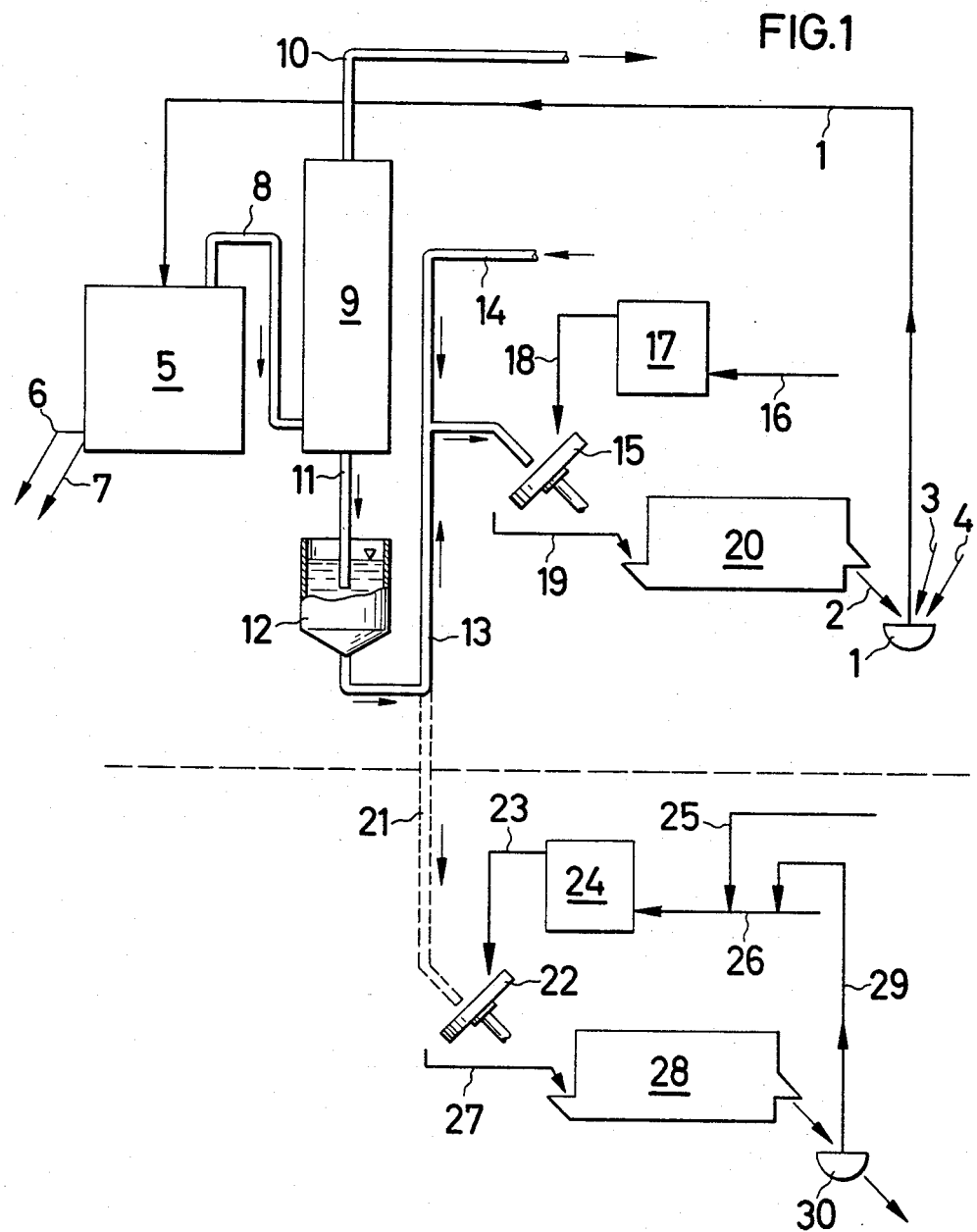

| United States Patent [19] | [11] Patent Number: 4,537,756 |
| Röttgen et al. | [45] Date of Patent: Aug. 27, 1985 |

[54] PROCESS FOR THE ELECTROTHERMAL PRODUCTION OF YELLOW PHOSPHORUS

[75] Inventors: Karl Röttgen, Erftstadt; Joachim Stendel, Brühl; Herbert Diskowski, Erftstadt, all of Fed. Rep. of Germany

[73] Assignee: Hoechst Aktiengesellschaft, Fed. Rep. of Germany

[21] Appl. No.: 627,427

[22] Filed: Jul. 3, 1984

[30] Foreign Application Priority Data

Jul. 18, 1983 [DE] Fed. Rep. of Germany ....... 3325813
Feb. 11, 1984 [DE] Fed. Rep. of Germany ....... 3404952

[51] Int. Cl.$^3$ .................... C01B 25/01; C01B 25/02; C01B 25/04
[52] U.S. Cl. .................................... 423/323; 423/99; 423/322
[58] Field of Search ................... 423/322, 323, 107, 99

[56] References Cited

U.S. PATENT DOCUMENTS

| 2,267,077 | 12/1941 | Burke ................................. 423/323 |
| 3,734,717 | 5/1973 | Seglin et al. ........................ 423/323 |
| 3,743,700 | 7/1973 | Orr ..................................... 423/322 |
| 4,420,466 | 12/1983 | Park et al. .......................... 423/322 |

FOREIGN PATENT DOCUMENTS

| 247219 | 7/1927 | United Kingdom ................ 423/322 |
| 971343 | 9/1964 | United Kingdom ................ 423/322 |

*Primary Examiner*—Gregory A. Heller
*Attorney, Agent, or Firm*—Connolly and Hutz

[57] ABSTRACT

The disclosure relates to a process for removing foreign components, especially zinc, from the product cycle during the production of yellow phosphorus inside and electrothermal furnace. To this end, the disclosure provides for molten ferrophosphorus and a calcium metasilicate slag and also a dust-containing gas mixture consisting essentially of carbon monoxide and phosphorus in vapor form to be taken from the furnace charged with phosphate pellets, coke and gravel. After electrostatic separation of the dust from the gas mixture, the dust is water-treated and made into a dust suspension. Crude phosphate is granulated on a granulating means using a mixture of dust suspension and binder which preferably is a clay suspension. The granulated material is calcined on a sintering device and made into phosphate pellets. A portion of the molten slag taken from the electrothermal furnace is allowed to solidify and the solidified slag is ground. The ground slag and at least a portion of dust suspension are granulated on a granulating means. The granulated slag and dust suspension are dried. It is possible for the dried granulated matter to be ground once again, to be granulated once again together with a further portion of dust suspension, and to be dried again. The dried and granulated matter is ultimately calcined and made into pellets.

21 Claims, 2 Drawing Figures

PROCESS FOR THE ELECTROTHERMAL PRODUCTION OF YELLOW PHOSPHORUS

The present invention relates to a process for removing foreign components, especially zinc, from the product cycle in the production of yellow phosphorus inside an electrothermal furnace, which provides: for molten ferrophosphorus and slag consisting essentially of calcium metasilicate and also for a dust-containing gas mixture consisting essentially of carbon monoxide and phosphorus in vapor form to be taken from the furnace charged with phosphate pellets, coke and gravel; for the dust to be electrostatically separated from the gas mixture and for it to be water-treated and made into a dust suspension; for crude phosphate to be granulated on a granulating means using a mixture of the dust suspension and a clay suspension, and for the granulated matter to be calcined and pelletized on a sintering means.

It has long been known that yellow phosphorus can be produced inside an electrothermal furnace from a mixture of phosphate pellets, coke and gravel. More specifically, a dust-containing gas mixture consisting essentially of phosphorus in vapor form and carbon monoxide as well as molten ferrophosphorus and slag consisting essentially of calcium metasilicate is taken from the furnace. The dust-containing gas mixture is freed from dust in an electric precipitation system, the dust taken from the bottom portion of the electric precipitation system being water-treated and made into a dust suspension in a container series-connected to the system. The dust suspension is used together with a clay suspension as a binder for agglomerating crude phosphate on a rotating table, the agglomerated phosphate being subsequently calcined and pelletized. While the ferrophosphorus can under circumstances be worked up so as to recover vanadium which is contained in it, or can be used for making alloys rich in phosphorus, the fact remains that the slag is relatively useless material which is normally deposited (cf. "Ullmanns Enzyklopädie der Technischen Chemie", 4th edition, 1979, pages 288-295).

On recylcing the dust electrostatically separated from the gas mixture into the product cycle of the electrothermal furnace, various foreign components, such as zinc, cadmium and further heavy metals, but also commercially interesting metals, such as gallium and germanium, commence concentrating therein, the foreign components being partially present in phosphide form, e.g. zinc as $ZnP_2$ or $Zn_3P_2$.

The effects of a high content of foreign components in the product cycle of an electrothermal phosphorus furnace will now be exemplified with respect to zinc. In this connection, it should be borne in mind that the concentration of zinc in the product cycle of a phosphorus furnace depends primarily on the zinc present in the feed materials, especially in crude phosphate, about 4% of the zinc passed through the phosphorus furnace being taken therefrom together with the slag and ferrophosphorus. The zinc phosphides which are forming from reduced zinc in the furnace atmosphere saturated with phosphorus in vapor form, are sublimable and condense at temperatures of less than 1000° C. that prevail in the relatively colder regions of the furnace, the condensation effecting, for example, an incrustation of the furnace mixture of which the flowability becomes naturally impaired. The flowability of the furnace mixture and its permeability to gas are, however, the factors which are so critical for a good heat exchange between the upwardly flowing gas mixture of phosphorus in vapor form and carbon monoxide, and the downwardly sliding relatively cold furnace mixture. In the event of the gas mixture issuing from the furnace being too hot, the furnace cover and equipment disposed in it are subject to undue stress, and the efficiency of the electric precipitation system is reduced. In addition to this, on introducing the dust taken from the electric precipitation system at 400°-600° C. into water for obtaining a dust suspension, the zinc phosphides partially undergo hydrolysis. As a result of this, the dust suspension is rendered highly viscous and is then difficult to work up. Upon the introduction of clay, the dust suspension becomes even more viscous so that it is normally good practice to avoid adding clay to a dust suspension containing hydrolysis products of zinc phosphide. The use of a dust suspension without clay as the suspension inducing the granulation of crude phosphate is also not satisfactory in respect of the following points: it does not reliably ensure establishing the binding strength necessary for granulating the crude phosphate, nor does it ensure the formation of calcined phosphate pellets having a satisfactory resistance to abrasion. Phosphate pellets which lack satisfactory resistance to abrasion are known to effect the formation of dust-drifts reducing the permeability to gas of the furnace mixture and heat exchange between the gas mixture produced in the phosphorus furnace and the furnace mixture. In clear contrast with normal furnace operation, the temperature of the gas mixture issuing from the phosphorus furnace is increased, the operability of the electric precipitation system is impaired, and the electric power input of the phosphorus furnace is reduced.

It is therefore an object of this invention to provide a process for removing foreign components, especially zinc, from the product cycle during the manufacture of yellow phosphorus in an electrothermal furnace, with formation of a deposable product containing the foreign components in the form of insoluble matter.

To this end, the invention provides for a portion of the slag to be ground; for the ground slag to be granulated with at least a portion of dust suspension on a granulating means; and for the granulated material to be dried.

Further preferred and optional features of the invention provide:

(a) for the dried granulated material to be ground once again, for it to be granulated once again with a further portion of dust suspension and for it to be dried;

(b) for the ground material to be admixed with a compound containing calcium oxide, preferably limestone powder and/or hydrated lime;

(c) for the dried and ground granulated material and dust suspension to be granulated in a ratio by weight of 6:1-7:1;

(d) for the portion of slag which is to be ground to be admixed with filter cake obtained by filtering the dust suspension; for the slag and filter cake to be used in a ratio by weight of 0.5:1 to 10:1;

(f) for the mixture of slag and filter cake to be used in admixture with a compound containing calcium oxide, preferably limestone split;

(g) for the slag and/or mixture of slag and filter cake and/or mixture of slag, filter cake and compound containing calcium oxide to be ground to particles of which 80% has a size of less than 100 $\mu$m;

(h) for the granulated material to be dried at temperatures of 80° to 150° C.;
(i) for the ground slag and/or ground mixture of slag and filter cake and/or ground mixture of slag, filter cake and compound containing calcium oxide to be granulated with dust suspension in a ratio by weight of 5:1 to 7:1;
(j) for the dried granulated material to be pelletized and for the pelletized material to be given on to a deposition site together with residual untreated slag; and
(k) for the dried granulated material to be calcined at a temperature of 500° to 800° C.

The process of this invention permits the concentration of foreign components in the product cycle of a phosphorus furnace which originate from the feed materials, especially from crude phosphate, to be lowered in controlled fashion by the removal of a predetermined quantity of electrostatically precipitated dust. In other words, the present process even permits use to be made of crude phosphate rich in zinc in an electrothermal phosphorus furnace, substantially in the absence of operational disturbances.

By the process of this invention, the production of yellow phosphorus in an electrothermal furnace is rendered commercially more attractive, on the one hand, by an economy of coke and electric power otherwise needed for reducing foreign components removed from the furnace and, on the other hand, by the fact that yellow phosphorus is obtained in an increased yield, due to the zinc binding phosphorus in phosphide form. Outside the electrothermal furnace, however, the zinc phosphides undergo hydrolysis or become oxidized during the sintering step with loss of elemental phosphorus in the two cases.

The process of this invention can be carried out using a facility comprising a mill, granulating means and sintering means, such as customarily employed for making phosphate pellets.

In the process of this invention, the dried granulated material should preferably not be calcined immediately and deposited; it is preferable for it to be ground a second time; to be granulated with an additional quantity of dust suspension on a rotating plate, and to be dried. This procedure can be repeated as often as deemed desirable and until a desirable quantity of solid matter originating from the dust suspension is found to adhere to the slag. In this way, heavily contaminated granulated material is obtained which can subsequently be admixed with limestone powder or hydrated lime to replace CaO consumed during the formation of insoluble phosphates and to maintain the matrix'neutral to alkaline nature. The granulated matter with the concentrated contaminants therein is dried a last time and ultimately calcined.

The process of this invention provides for an economy of considerable energy, work-up time and capacity of machinery. To this end, the invention provides for the bulk of dust suspension removed from the phosphorus production to be first filtered and to be then separated into a filter cake and filtrate, which is recycled into the phosphorus production whilst the filter cake is ground jointly with the slag. Next, the mixture of ground filter cake and slag is granulated with the use of dust suspension, and the granulated material is dried and calcined. Following this, pellets containing e.g. 40 weight % dust suspension and more than 3 weight % zinc, can be obtained in a single step operation, which can be directly deposited jointly with untreated slag.

In the process of this invention, it is possible for the mixture of filter cake and slag to be used in admixture with 10-50 weight %, based on the filter cake, of a compound containing calcium oxide.

The process of this invention will now be described with reference to the accompanying drawing in which the block schemes above the horizontal broken line represent the product cycle in prior art production of yellow phosphorus, and of which the block schemes below that line represent the removal of foreign components, in accordance with this invention. More particularly, FIG. 1 represents the granulation of ground slag with dust suspension and FIG. 2 represents the granulation of a ground mixture of slag and filter cake obtained by filtration of dust suspension with the use of dust suspension the granulation being in each case followed by drying and calcining steps with the resultant formation of pellets.

With reference to the drawings:

A weighed quantity 1 of phosphate pellets 2, coke 3 and gravel 4 is introduced into an electrothermal reduction furnace 5. Molten slag 6 and ferrophosphorus 7 are taken from the lower portion of furnace 5. The cover of furnace 5 terminates in a conduit 8 transporting a dust-containing gas mixture consisting essentially of carbon monoxide and phosphorus in vapor form into an electric precipitation system 9. Gas mixture free from dust leaves the electric precipitation system 9 through a conduit 10 running to a condensation means, whilst dust is taken from the bottom portion of the electric precipitation system 9 and introduced into an agitator-provided vessel 12 containing water, through a line 11 dipping thereinto. Dust suspension containing the foreign components is taken from the bottom portion of vessel 12, admixed with clay suspension coming from line 14, and the mixture is given through line 13 on to a rotating plate 15. Crude phosphate is introduced with the aid of a conveying means 16 into a mill 17, the ground phosphate being transported by conveying means 18 to rotating plate 15 and pelletized using the mixture of dust suspension and clay suspension as a binder. The pelletized material is transported through conveying means 19 to sintering installation 20, dried therein and subsequently calcined to give crude phosphate pellets.

Figure 2:
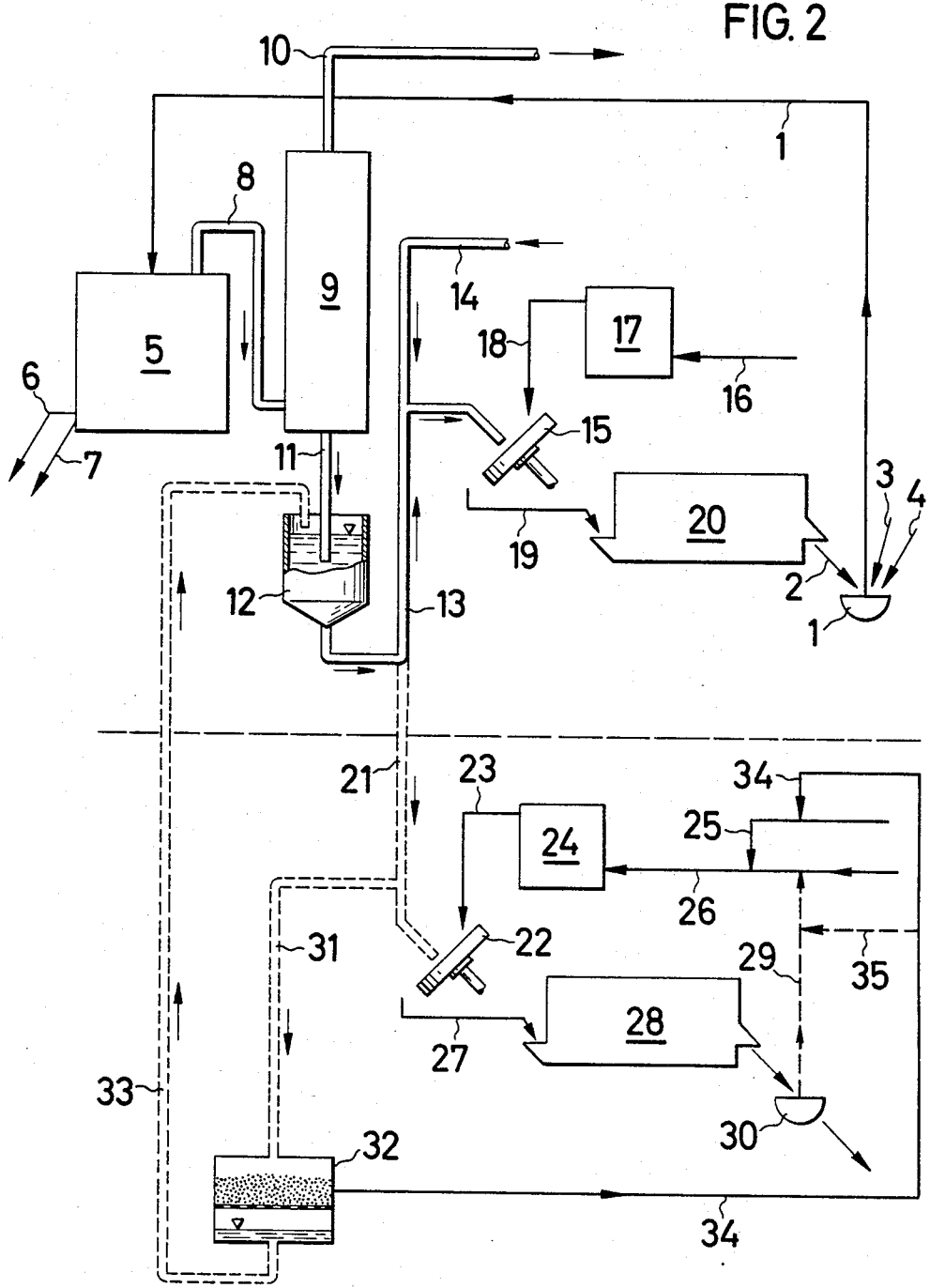

As shown in FIG. 1, a portion of dust suspension with the foreign components therein is removed through line 13 and given through line 21 on to a rotating plate 22. Ground slag coming from conveying means 23 is given on to the rotating table 22 on which it is granulated with the aid of dust suspension coming from line 21. The ground slag originates from granular slag initially introduced through conveying means 25 and 26 into mill 24. The granulated material is transported through conveying means 27 to sintering installation 28 in which it is either merely dried and introduced again through conveying means 29 and 26 into mill 24, or dried and calcined and removed from conveying means 30 for deposition.

As shown in FIG. 2, a portion of dust suspension with the foreign components therein is removed through line 13 and a portion of it is passed through line 21 on to rotating plate 22. Line 21 opens into a branch line 31 through which a further portion of dust suspension is introduced into a filter 32. Filtrate is recycled from filter 32 through line 33 into the agitator-provided vessel 12, whilst filter cake is passed through conveying means 34 into conveying means 25 transporting granular slag. The mixture of filter cake and granular slag is dropped on conveying means 26 connected to mill 24 in the direction of flow of the materials. The ground mixture of filter cake and slag coming from mill 24 is passed through conveying means 23 on to rotating plate 22, on which it is granulated with the aid of dust suspension coming from line 21. The granulated material is transported through conveying means 27 to a sintering installation 28, in which it is merely dried and recycled, after admixture of a further quantity of filter cake coming from conveying means 34 and 35 into mill 24 through conveying means 29 and 26; or dried and calcined to pellets which are removed from transporting means 30 for deposition.

EXAMPLE 1

1100 tons/day crude phosphate which inter alia contained 7.5. $10^{-3}\%$ zinc as foreign component was put through in two electrothermal furnaces for the production of yellow phosphorus, which had an average total power of 75 megawatts. The gas mixture consisting essentially of carbon monoxide and phosphorus in vapor form was passed through the electric precipitation system; the dust precipitated per day gave dust suspension containing about 25 metric tons solid matter. Based thereon, the dust suspension contained 8.3% zinc (corresponding to about 2 tons).

As shown in the block scheme of FIG. 1, crude phosphate as furnace feed material was made into pellets along the sintering path (above the broken line) comprising mill 17, rotating plate 15, sintering installation 20. The sintering path (below the broken line) comprising mill 24, rotating plate 22, sintering installation 28 was used for removing deposable dust suspension in accordance with this invention. Cooling gas of about 440° C. originating from sintering installation 20 was used for drying granulated material in sintering installation 28.

In mill 24 forming part of the lower sintering path, 80 tons dehydrated granulated phosphorus furnace slag was ground to particles of which 80% had a size of less than 100 μm and subsequently granulated with dust suspension on rotating plate 22. The granulated material was dried on sintering installation 28 with the hot gas of 440° C. and it then contained about 0.5% residual moisture. The dry granulate was ground again, altogether 11 times, granulated with the use of additional quantities of dust suspension and dried until it finally contained 3.6% zinc. Next, the dry granulate was calcined and pelletized at 800° C. on sintering installation 28 using additional burners. The pellets so obtained were free from elementary phosphorus and phosphides.

By the repeated use of dried granulate for reaction with dust suspension in accordance with this invention, it was possible for 140 m³ (or 175 tons) dust suspension to be processed with the 80 tons slag.

EXAMPLE 2

A ground mixture of 40 kg phosphorus furnace slag and 10 kg limestone powder (80% of particles less than 0.1 mm in size) was placed in a 250 liter granulating drum, granulated therein with dust suspension and dried at 110° C. The granulate was ground again, granulated again with an additional quantity of dust suspension and dried at 110° C. This operating cycle was repeated, altogether 14 times. Next, the dried granulate was calcined at 800° C. with the resultant formation of pellets which contained 5.8% zinc. The dust suspension used had a density of 1.2 kg/l, contained about 30% solid matter and 13% zinc, based on the solid matter.

EXAMPLE 3

40 kg ground phosphorus furnace slag and 29.6 kg filter cake originating from the filtration of dust suspension, were placed in the granulating drum of Example 2 and mixed therein. Next, the mixture was granulated with the aid of dust suspension.

The granulate was dried at 110° C. and calcined at 800° C. The resulting pellets contained 6.1% zinc. The dust suspension used had a density of 1.2 kg/l, contained about 30% solid matter, and 13% zinc, based on solid matter.

The pellets obtained in Examples 1 through 3 were subjected to an extraction test with distilled water (cf. DIN-specification (DIN stands for German Industrial Standard) No. 38 414 (draft), part 4, April 1983). The analytical data determined for the three materials extracted are indicated in the following Table.

TABLE

| | Analytical data of materials extracted (mg/l) | | |
|---|---|---|---|
| | Example 1 | Example 2 | Example 3 |
| As | 0.02 | <0.01 | 0.02 |
| F | 3 | <1 | 3 |
| Fe | 5 | <1 | 8 |
| Cr | 0.05 | <0.05 | 0.05 |
| Ni | <0.05 | <0.05 | <0.05 |
| Ti | 0.2 | <0.1 | 0.2 |
| V | <1 | <1 | <1 |
| U | 0.05 | <0.005 | 0.06 |
| Ba | <0.5 | <0.5 | <0.5 |
| Cd | <0.01 | <0.01 | <0.01 |
| Cu | 0.06 | <0.05 | 0.06 |
| Zn | 0.02 | <0.01 | 0.04 |
| Pb | <0.05 | <0.05 | <0.05 |
| Mn | 0.08 | <0.05 | 0.09 |

It can be inferred from the above data that pellets made with the addition of limestone powder (cf. Example 2) to phosphorus furnace slag compare favorably with pellets made without addition of limestone (cf. Examples 1 and 3), as regards deposability which is improved.

We claim:

1. A process for making yellow phosphorus from phosphate pellets, coke and gravel inside an electrothermal furnace while removing foreign components from the furnace's material cycle which comprises: removing molten ferrophosphorus, a molten calcium metasilicate slag and a dust-containing gas mixture consisting essentially of carbon monoxide and phosphorus in vapor form from the furnace; separating the dust electrostatically from said gas mixture; treating said dust with water with the resultant formation of a dust suspension; granulating crude phosphate and a mixture of dust suspension and binder on a granulating means; calcining the granulated material on a sintering means; and making it into phosphate pellets; grinding a portion of said slag; granulating the ground slag and at least a portion of dust suspension in a ratio by weight of 5:1 to 7:1 on a granulating means; drying and calcining the granulated material with the resultant formation of pellets containing the foreign components selected from the group consisting of zinc, cadmium and further heavy metals in the form of insoluble matter; and giving said pellets on to a deposition site.

2. The process as claimed in claim 1, wherein the binder is a clay suspension.

3. The process as claimed in claim 1, wherein the slag is ground to particles of which 80% has a size smaller than 100 μm.

4. The process as claimed in claim 1, wherein the granulated material is dried at temperatures of 80° to 150° C.

5. The process as claimed in claim 1, wherein the dried granulated material is calcined at temperatures of 500° to 800° C.

6. The process as claimed in claim 1, wherein the dried granulated material is ground once again, prior to its calcination, granulated once again together with an additional quantity of dust suspension in a ratio by weight of 6:1 to 7:1, and dried.

7. The process as claimed in claim 6, wherein the ground granulated material is used in admixture with a compound containing calcium oxide.

8. The process as claimed in claim 7, wherein the compound containing calcium oxide is limestone powder.

9. The process as claimed in claim 7, wherein the compound containing calcium oxide is hydrated lime.

10. A process for making yellow phosphorus from phosphate pellets, coke and gravel inside an electrothermal furnace while removing foreign components from furnace's material cycle which comprises: removing molten ferrophosphorus, a molten calcium metasilicate slag and a dust-containing gas mixture consisting essentially of carbon monoxide and phosphorus in vapor form from the furnace; separating the dust electrostatically from said gas mixture; treating said dust with water with the resultant formation of a dust suspension; granulating crude phosphate and a mixture of dust suspension and binder on a granulating means; calcining the granulated material on a sintering means; and making it into phosphate pellets; grinding a portion of said slag; granulating a mixture of the ground slag and a filter cake obtained by filtering said dust suspension, in a ratio by weight of 0.5:1 to 10:1 on a granulating means; drying and calcining the granulated material with the resultant formation of pellets containing the foreign components selected from the group consisting of zinc, cadmium and further heavy metals in the form of insoluble matter; and giving said pellets on to a deposition site.

11. The process as claimed in claim 10, wherein the mixture of slag and filter cake, and dust suspension are used in a ratio by weight of 5:1 to 7:1, and granulated.

12. The process as claimed in claim 10, wherein the mixture of slag, filter cake and compound containing calcium oxide, and dust suspension are used in a ratio by weight of 5:1 to 7:1 and granulated.

13. The process as claimed in claim 10, wherein the granulated material is dried at temperatures of 80° to 150° C.

14. The process as claimed in claim 10, wherein the dried granulated material is calcined at temperatures of 500° to 800° C.

15. The process as claimed in claim 10, wherein the binder is a clay suspension.

16. The process as claimed in claim 10, wherein the slag is ground to particles of which 80% has a size smaller than 100 μm.

17. The process as claimed in claim 10, wherein the dried granulated material is ground once again, prior to its calcination, granulated once again together with an additional quantity of filter cake in a ratio by weight of 0.5:1 to 10:1, and dried.

18. The process as claimed in claim 17, wherein the dried granulated material is ground to particles of which 80% has a size smaller than 100 μm.

19. The process as claimed in claim 17, wherein the dried granulated material is used in admixture with a compound containing calcium oxide.

20. The process as claimed in claim 19, wherein the compound containing calcium oxide is limestone split.

21. The process as claimed in claim 19, wherein the mixture of dried granulated material and the compound containing calcium oxide is ground to particles of which 80% has a size smaller than 100 μm.

* * * * *